Nov. 25, 1958 P. J. C. CHENUS 2,861,740

ELECTRONIC ADDING DEVICE

Filed Sept. 23, 1952 3 Sheets-Sheet 1

Nov. 25, 1958 P. J. C. CHENUS 2,861,740

ELECTRONIC ADDING DEVICE

Filed Sept. 23, 1952 3 Sheets-Sheet 2

Nov. 25, 1958 P. J. C. CHENUS 2,861,740

ELECTRONIC ADDING DEVICE

Filed Sept. 23, 1952 3 Sheets-Sheet 3

United States Patent Office 2,861,740

Patented Nov. 25, 1958

2,861,740

ELECTRONIC ADDING DEVICE

Pierre Jacques Charles Chenus, Paris, France, assignor to Compagnie des Machines Bull (Societe Anonyme), Paris, France Application September 23, 1952, Serial No. 311,039

Claims priority, application France September 25, 1951

7 Claims. (Cl. 235—61)

Figure 1:
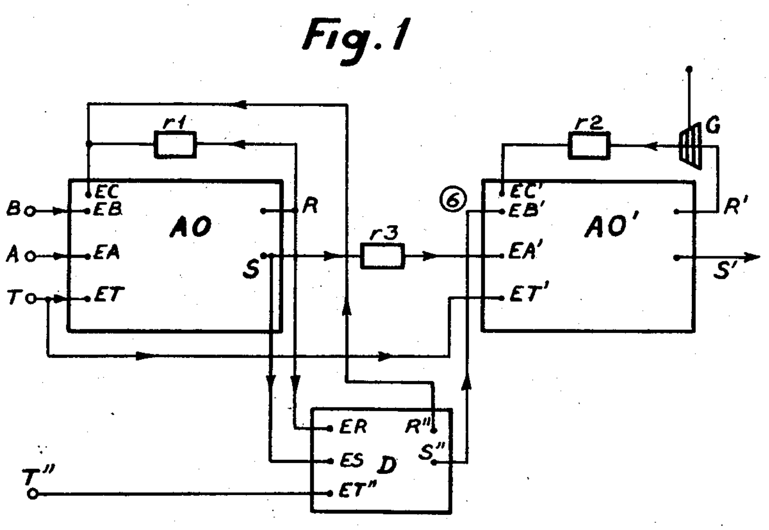

The present invention concerns an operator device for adding two decimal numbers which are "coded," or written in "coded" impulses, that is represented by impulses either emitted or not, at regular intervals, corresponding to the values 1, 2, 4, 8, 10, 20, 40, 80, 100, etc. of which the sum forms a determined number, the said operator device, or more briefly, the said operator, receiving at two inputs, the coded impulses, corresponding to the two numbers to be added, and providing at an output, the coded impulses representing the sum of the two numbers.

Addition operators operating in pure binary notation are already known, that is, in which the impulses received and emitted correspond to the successive power of 2. Also, certain realizations of such binary adders, for coded numbers are already known. An electronic binary adder for pure binary numbers has for example been described in the U. S. patent application, No. 280,820 filed on April 5, 1952 (now Patent No. 2,781,968).

For simplification purposes, it will be said in the following, that "a 1, a 2, a 4, etc. . . . appears" (or is produced etc.) instead of "an impuse or a combination of impulses representing these values appears."

The object of the present invention is to provide a decimal adder for adding two coded numbers comprising a first and a second binary adders and a comparing device which detects at each decimal period the eventual appearance of the values 2 or 4, in the impulses of a transient result, and emits an impulse in a delay line circuit, the said impulse remaining temporarily in circulation, in order to be used subsequently if an 8 is produced, so as to bring about the addition of 6 to said transient result. The presence of a decimal carry-over i. e. the carry-over impulse produced at the end of a decimal period, also having for effect the bringing about of the corrective addition of 6. If a transient result equal or superior to 10 has been obtained at the output of the first binary adder, this result is transformed into a decimal number, by adding 6 to it, subtracting 16, since $$x+6-16=x-10$$

and controlling the transfer of a carry-over of 1 in the next higher decimal denomination.

Another object of the present invention is a decimal adder for adding two coded decimal numbers, including two binary adders adapted to work on numbers written in pure binary notation, arranged in series, the first binary adder receiving the impulses of the two numbers to be added, and the second one, the output of the first and eventually the value 6 in each decimal period, and a comparing device for detecting at each decimal period if the transient sum leaving the first binary adder is greater than 9, in order to control accordingly, the corrective addition of 6 in the said second binary adder, at the time said transient sum reaches said second adder.

According to a first embodiment of the invention, the comparing device is adapted so that, when said transient sum exceeds 9, a pulse is produced, delayed and duplicated into two impulses of values 2 and 4 which are thereafter introduced into said second binary adder.

According to a second embodiment of the invention, the comparing device comprises a storage loop and is adapted so that, when said transient sum exceeds 9, a pulse is set in circulation into the loop in which it appears at the times of pulses of values 8 and 1 to control the entry of two pulses of values 2 and 4 into said second binary adder.

Figure 2:
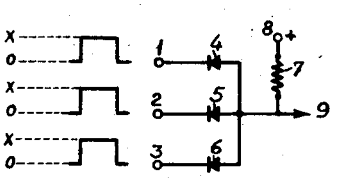
Figure 3:
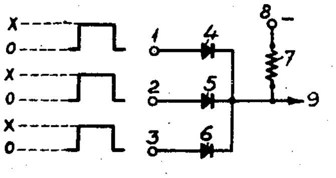
Figure 4:
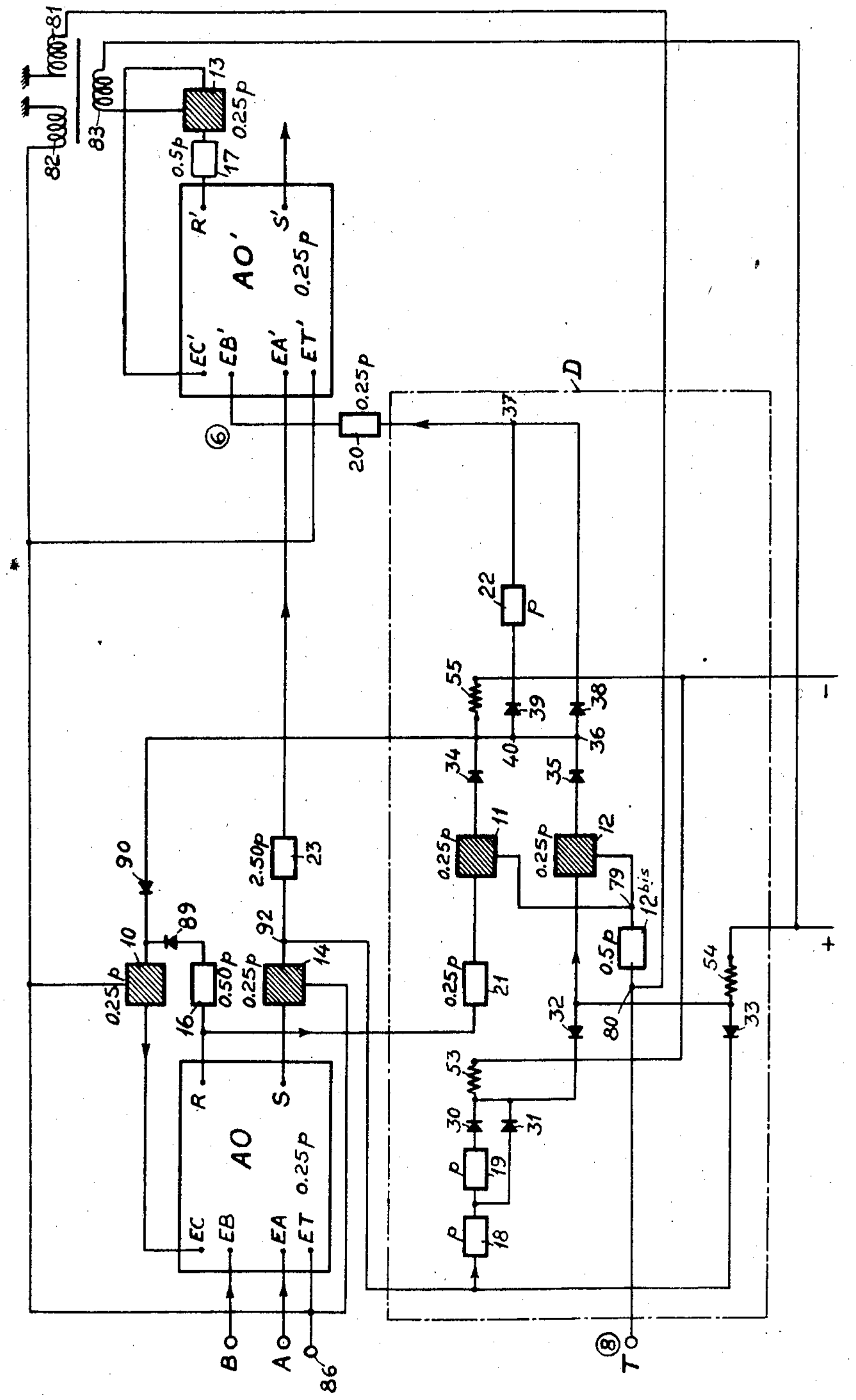
Figures 5, 5A:
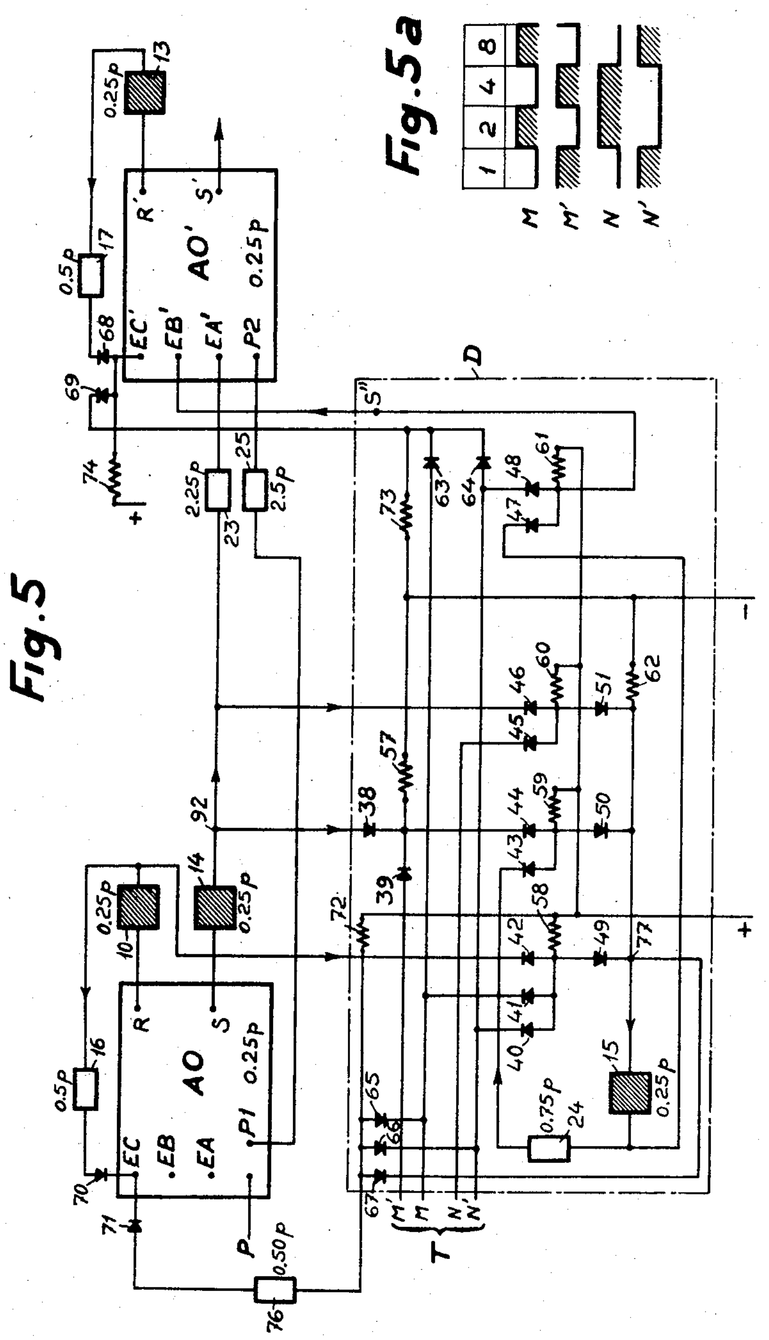

The invention will be more fully understood and explained when consulting the attached drawings, which represent, in diagram form respectively the following:

Figure 1, a block diagram of a decimal adder according to the invention;

Figures 2 and 3, known arrangements of rectifiers;

Figure 4, a first embodiment of a decimal adder according to the invention;

Figure 5, a second embodiment of a decimal adder according to the invention;

Figure 5a, a graph of the control signals used in the circuit diagram of Figure 5.

When consulting Figure 1, a three input binary adder operating in pure binary notation is seen at AO, that is when this device receives eventual impulses representing numbers A and B, at its inputs EA and EB, these impulses arrive in a predetermined time relationship with control impulses T which are regularly recurrent and are applied at ET, these eventual impulses when existing, represent values equal to the successive powers of 2. The said device AO provides at an output S impulses of the same nature representing the transient binary sum $A+B$. An output R eventually emit a carry-over impulse at each binary period, which is applied at an input EC of AO, through an appropriate delay element $r_1$, in order to join the impulses arriving at EA and EB, in the following binary period. The carry-over circuits, passing through $r_1$ may advantageously include an impulse regenerator of the type described in the U. S. patent application No. 292,563 filed on June 9, 1952 even though such a regenerator has not been represented. AO′ represents a three input binary adder of which the operation is the same as for AO, the corresponding letters being marked with the index "′". At input EA′ of AO′, are applied the impulses coming from output S of AO; at input EB′, two impulses are eventually applied, which together represent the value 6 (six). D is a comparing device conditioning the application of the value 6. To this end, at ET″ which may be a single or multiple input, it receives either a single control impulse of value 8, or several combinations of control impulses arriving by way of several different channels at each decimal period. In all cases, the values of these control impulses are well defined, in the decimal period. Moreover, at ES, D receives the impulses derived from the sum of the two numbers A and B, which impulses have been taken at S, and at ER, receives the carry-over impulses collected at R. A delay element $r_3$ should be inserted between EA′ and S, having a delay value great enough so that the sum of the impulses of the sum $A+B$ in a same decimal period may be compared at D with respect to 9, and so that D may subsequently send two impulses corresponding to 2 and 4 respectively, through S″-EB′ at the desired time, so that these impulses may be added to the impulses coming from S. According to the invention, D detects the 2's, 4's and 8's, successively leaving AO; each time a 2 and an 8, or a 4 and an 8 are produced in the same decimal period, or impulses representing a number greater than 9, when totaled, it is necessary to send the value 6 to AO′. Towards this end, the invention provides for the circulation of an impulse in a delay line (not represented in Figure 1), if a 2 or a 4 is delivered by operator AO, during a given decimal period; if an 8 is delivered in the same decimal period, the said impulse is used for bringing about the introduction of the value 6. If no 8 is delivered, the impulse is blocked and is not used. D therefore includes at least two inputs, and two conditions of operation. In the first, it transmits the impulses applied to one of the inputs, to its output, and in the second, it blocks all input impulses, by means of a switch, or a system of switches. These switches, which will hereinafter be called gates, may be combinations of diodes and resistors, or electronic tubes working as conditioned impulse regenerators. Their operation is then controlled by control impulses. In each decimal period, each gate is controlled by impulses of value 8, coming from input T″. Moreover, if a carry-over impulse is produced at the time of an impulse 8, in the result provided by AO, it is also necessary to introduce the value 6 into the second binary adder AO′, as has been explained.

In brief, D is a device which may be realized by using known means and which includes two channels: one including a gate which detects carry-over at time 8 of each decimal period, and the other including a system of gates for the successive detection of impulses of values 2, 4 and 8, while at a specific subsequent time, transmitting an impulse which may or may not be utilized; the necessity of putting the different gates into action by means of one or several combined control impulses in a decimal period is thus evident.

The device D is adapted to create at R″ a decimal carry-over impulse when the transient sum $(A+B)$ impulses received at ES represent a value from 10 to 15. By decimal carry-over, it is meant any carry-over from a decimal denomination to the following or next higher denomination. This carry-over impulse, when occurring, should be transmitted from R″ to EC in AO, so that this impulse may be added in correct time relationship to the impulses representing A and B.

As the function of adding decimal carry-over impulse is effected by AO, this function should be prevented in AO′. Therefore it is necessary to suppress at EC′ the introduction of any decimal carry-over impulse having a value 1 in AO′. The gate G is provided and suitably controlled for this purpose, over the circuit pat R′–EC′.

Figure 2 and 3 show known arrangements of rectifiers, which constitute gates and buffers and correspond to the logical concepts "and" and "or" respectively; these arrangements are used in the embodiment of the invention here described, and will be described in summarizing. A terminal is seen at 8 of Figure 2, to which a positive voltage is applied which is high, in comparison with impulses applied at 1, 2 and 3, terminal 8 is connected to a resistor 7 of a very high value, as compared with the forward resistance of rectifier cells 4, 5 and 6. Resistor 7 is connected by its other end to the three aforementioned cells 4, 5 and 6 (diodes or dry rectifiers). The other terminals of these rectifiers: 1, 2 and 3, are connected to appropriate voltage sources; the voltage of these sources may be of two levels O and X (positive) shown opposite the corresponding terminals. If one or two of the terminals 1, 2 or 3 simultaneously receive positive impulses and if the third terminal remains at 0 voltage, the impulses in question are stopped. In order for an impulse to pass through 9, while being applied to an appropriate impedance circuit, it is necessary that the positive impulse be applied simultaneously at 1, 2 and 3; this means that the arrangement of Figure 2, indicates the "and" concept (1 and 2 and 3). The operation of gate 4, 5, 6 is well known per se.

On the other hand, in the circuit shown in Figure 3, where the unidirectional elements are arranged in the opposite way, a high negative voltage being applied at 8, it is only necessary that a positive impulse be applied at 1 or 2 or 3, or at a number of these terminals at the same time, in order for this arrangement to transmit an impulse by 9, to a suitable impedance circuit; i. e. the arrangement shown in Figure 3 and termed "buffer," indicates the concept "or".

Figure 4 represents a first embodiment of the invention, in which the impulses circulate in a single direction in the comparing device D, which includes two regenerators 11, 12 specially used here as gates. On this Figure 4, the inputs marked EA, EB, EC correspond to those marked E*a*, E*b* E*c* on the Figure 3 in the aforementioned application No. 280,820. On this Figure 4, the terminals ET and S correspond to those marked T and D respectively, on Figure 3 of said application. On this Figure 4 the terminal 8 corresponds to a tap taken on the conductor between regenerator 14 and delay element 15 on Figure 3 of said application.

The regenerator 14 and delay element 15 on said Figure 3 are represented by 10 and 16 respectively on this Figure 4. They are connected in a converse order so as to permit the insertion of two rectifiers 89, 90 to the circuit path of the carry loop.

All of the regenerators 10, 11, 12, 13, 14 are of the type disclosed in the U. S. application No. 292,563 filed June 9, 1952 for "Pulse Reshaper." In such a regenerator a control input receives a positive going timing impulse at each binary period, the duration of said period being $p$. The inherent delay time of the regenerator is $0.25p$ as indicated on the drawings.

The terminal 86 receives timing impulses emitted at each binary period. At output S of AO, a regenerator 14, is connected, which provides "fresh" impulses. These impulses enter a buffer, which includes unidirectional elements 30 and 31 and resistor 53, through delay elements 18 and 19, (of which the delay value is one binary period $p$). The output of the said buffer is connected to one of the inputs of a gate, including unidirectional elements 32 and 33, and resistor 54, the output of which being connected to the input of regenerator 12; the other input is directly connected to the output of regenerator 14. Regenerator 12 receives from T a control impulse only at times $8+0.75p$, through delay line 12 bis, and consequently, it regenerates an input impulse only when this impulse is applied to it on the third quarter of the binary period 8 of each decimal period. It is seen that in each decimal period equal to $4p$, an impulse will be regenerated only if during this period, the binary adder AO emits an impulse of value 2 or 4 and an impulse of value 8, which indicates a transient sum equal to or greater than 10. This impulse passes by way of 33 (the sum of the delay times of AO and 14 being equal to $p/2$), while another impulse crosses element 32 simultaneously. The impulse of weight 2 having crossed delay line 18, of value $p$, and line 19, of value $p$, reaches element 32 at time $8+0.5p$, while the impulse of weight 4, having crossed 18 only, reaches element 32 at the same instant. In this case, at time $8+0.75p$ of the decimal period in question, regenerator 12 emits an impulse at its output. When said transient sum is equal to or greater than 16, no impulse of value 8 is gathered at S, but a carry-over impulse is emitted from R at time $8+0.25p$ by binary adder AO, this impulse which will have the value 1, at the time of its arrival at AO, is reintroduced into input EC of AO through delay line 16 and regenerator 10. From terminal R, this impulse also passes through a delay element 21 of which the delay value is $0.25p$, then reaching a regenerator 11, similar to 12. The outputs of regenerators 11 and 12 are connected to a buffer, comprised of two unidirectional elements 34 and 35 and of a resistor 55. If an impulse is applied at 34 or 35, this buffer provides an impulse which is duplicated in two successive impulses, due to delay element 22, the delay times of which being $1p$. The junction point 37 is connected to input EB′ of the binary adder AO′ through delay element 20 of $0.25p$. At 38 and 39, unidirectional elements, similar to elements 30 and 31, have been represented in two branch circuits, that is 40, 39, 22, 37 and 36, 38, 37 respectively.

The two impulses obtained in this way, when the transient sum is greater than 9, have the values 2 and 4, that is 6, when they reach EB' at the same times as eventual impulses 2 and 4 reach EA', said eventual impulses coming from S, through regenerator 14 and delay element 23, the delay time of which being $2.5p$. It is assumed that AO and each of the regenerators have a characteristic delay of ¼ of a binary period (this, without limiting the invention, the value of 23 simply being adjusted accordingly).

The transformer included in regenerator 13 has been represented because it is fitted with a further primary winding 81, the normal primary windings being respectively 82 and 83. This transformer corresponds to the transformer *tr*2 of Figure 1 in the aforementioned application No. 292,563. Winding 82, being connected to ET, receives at each binary period a positive going timing impulse. Each of these impulses induces or tends to induce a negative going pulse appearing across the secondary winding 83, and transmitted to the cathode of the pentode tube of the regenerator. On the other hand, winding 81, wound or connected in a direction contrary to that of winding 82, receives, from junction point 80, the control impulses applied at terminal T(8).

At times 1, 2 and 4 (relative to inputs of adder AO), any carry-over impulse received from R' through 17 at input of regenerator 13, may be regenerated and hence applied to EC'. At time 8 relative to adder AO (that is at time 1 relative to adder AO'), the control pulse received by winding 81 opposes to the flux change provoked by winding 82, so that there is no negative going pulse appearing across winding 83. Thus no carry-over impulse can be re-introduced at input EC' when having the value 1.

The operation of the decimal adder will be best understood by explaining a problem as an example. Let numbers $A=8$ and $B=6$ to be added. During the first decimal period, EA and EB respectively receive positive pulses of values 8 and 2, 4 at the beginnings of the corresponding binary periods. The resulting pulses 2, 4 and 8 appear at the output 92 of regenerator 14 with a delay time of half a binary period. During the binary period 4, the 2 pulse having passed through 18 and 31, and the 4 pulse simultaneously reach the gate rectifiers 32 and 33, but the resulting output pulse is not admitted to pass on by the gating regenerator 12. During the binary period 8, the 2 pulse having passed through 18, 19, 30 the 4 pulse having passed through 18, 31, and the 8 pulse simultaneously reach the gate rectifiers 32, 33 and they confound to enter gating regenerator 12. On the fourth quarter of the binary period 8 in the first decimal period, the 8 control pulse from T'' and 12 bis, opens regenerator 12 and causes a pulse to be available at point 40 at the same time. The same pulse circulates through 38 on the one hand and through 39, 22 on the other hand, giving rise to two successive pulses going through delay element 20. At the beginning of the binary periods 1 and 2 on the second decimal period, these pulses reach EB' where they assume the values 2 and 4 respectively. The pulses of the transient sum, having passed through 23, reach terminal EA' respectively at the beginnings of the 1, 2 and 4 binary periods of the second decimal period, said times having the values 2, 4 and 8 when considering the adder AO'. Thereafter binary adder AO' operates normally, that is to say, as it is well known, there is no output at the sum terminal S' when a pair of pulses is received at the inputs whereas a sum output pulse is available at S' when one pulse or three simultaneous pulses are received at the inputs of the adder. Now during the binary period 2, second decimal period, relative to AO, inputs EA', EB' and EC' all receive simultaneous pulses and a single pulse having the 4 value emerges at output S', representing in the decimal sum 14, the units digit 4.

The pulse resulting from the detection of a transient sum from 10 to 15 and appearing at the end of the first decimal period at point 40, is entered through 90 into the carry loop of AO, reaching EC on the first quarter of the binary period 1 of the second decimal period. This pulse follows a circuit path comprising AO, 14, 23 and AO' and appears at terminal S' during the binary period 1, second decimal period relative to AO', thus representing in the decimal sum 14, the tens digit 1. Multi digit numbers could be added as well according to the same process.

Figure 5 represents a second embodiment of the invention, in which impulses of values 2, 4 and 8 entering into the comparing device D, are compared with control pulses delivered by an external pulse generator.

The comparing device D, includes several gates and buffers of the type shown in Figures 2 and 3, made up of unidirectional elements 40 to 48 and 63 to 67, resistors 57 to 62 and 72, 73, and a regenerator 15, placed in a circulation loop, which includes a delay element 24. The gates are made up of the following elements: (40, 41, 42, 58), (43, 44, 59), (45, 46, 60), (47, 48, 61), (65, 66, 67, 72), and the buffers consist in: (38, 39, 57), (49, 50, 51, 62), (63, 64, 73). Regenerators 10, 13 and 14 are used in the prior embodiment for the reshaping of impulses, but regenerator 13 is identical to the other ones. There are four kinds of control impulses T: M, M', N, N', which are periodically reproduced in the way shown in Figure 5*a*. The operation of the system is as follows.

The beginnings of times 1, 2, 4, 8 always coincide with the entrance of numerical impulses into binary adder AO. If an impulse appears at 46 at time $2+0.5p$ corresponding to an input impulse of value 2, and since at this moment, 45 is under positive voltage, the impulse may pass by way of 51, which belongs to a buffer, and is applied at the input of 15. The delay time of 15, being $0.25p$, and the delay of 24 being $0.75p$, this impulse is applied again at 43 at time $4+0.5p$ corresponding to an impulse of value 4.

Impulse M' which is always applied at 39 at time 4, is applied at 44 at the same time as the impulse arriving at 43; a new impulse is then applied at the input of 15, through 50. Apart from this, if an impulse appears at time 4 at 46, since 45 is still under voltage through N at this moment, an impulse applied to the input of 15 by 51 results.

Therefore, if an impulse appears at time $2+0.5p$ or at time $4+0.5p$, or at both times across element 46, an impulse applied to 15, at time 4 results. This impulse causes the application of an impulse to 43, one period $p$ later, that is to say time $8+0.5p$. If at this moment, an impulse of value 8 passes by 38 and is applied at 44, it is joined with the impulse circulating through 43. As a result, an impulse leaves by 50, which is again applied at 15. If there is no impulse of value 8, or if there has been no impulse of value 2 or 4, it is evident that no impulse leaves by 50. Finally, a circulating impulse issues at the output of 15, and is applied to rectifier cell 47, at time $8+0.75p$, 48 being energized at the same moment by N', therefore permitting an impulse to be applied at EB'. Said circulating impulse also passes by 24, and 43, which is thus under voltage at time $1+0.5p$; M' is again active at time 1, and 39 and 44 are under voltage at this moment; a circulating impulse is again regenerated by 15, and applied on 47; 48 is also under voltage at time 1, and a second impulse is applied to EB' at time $1+0.75p$. Thereafter, the circulation loop is reset since there is no impulse 2 coming from M' to open gate 43, 44.

If a decimal carry-over is produced at time 8, elements 40, 41 and 42 are under voltage simultaneously, and an impulse is applied at 15 by 49, with the same result as formerly when an impulse of value 8 and another impulse of value 2 or 4 were emitted by AO during the same decimal period.

As the two 8 and 1 corrective pulses supplied by D to EB′ should be equivalent to two pulses of values 2 and 4 respectively, the delay time of element 23 is adapted so that the latter may transmit pulses with a time shift of two binary periods, plus 0.25*p* for taking into account the delay inherent to regenerator 15.

The gate (65, 66, 67) permits the selection of a decimal carry-over impulse taken at 77, only at time 8, with respect to D or AO, the combinations of M (8 and 2) and of N′ (8 and 1) actualy have only 8 in common. The said impulse is applied at EC through delay element 76 of 0.5*p*, and through a unidirectional element 71. The buffer (63, 64), on the other hand, permits the passage of a voltage at times 1, 2 and 8; this voltage is applied to unidirectional element 69, which is part of the gate (68, 69, 74), which is therefore open at times 1, 2 and 8, and blocked at time 4 relative to AO, which corresponds to a time 1 relative to the inputs of AO′. By this way an eventual carry-over pulse of value 1 when reaching 68 is not permitted to enter EC′ in AO′ for the same reasons as those previously stated.

The operation of the second embodiment will be best understood by explaining a problem as an example. Let numbers $A=8$ and $B=6$ to be added. During the first decimal period, EA and EB respectively receive positive pulses of values 8 and 2, 4, just on the first quarter of the corresponding binary periods. The resulting pulses 2, 4, 8 appear at the output 92 of regenerator 14 with a delay time of half a binary period. During the binary periods 2 and 4, the corresponding pulses pass through the gate 45, 46, the buffer element 51 and enter the regenerator 15, in the circulation loop comprising 77, 15, 24, 43 and 50. The circulation is maintained by means of the impulse 8 coming from 92 through 38, 44 and 50. The circulation is still maintained during the binary period 1 of the second decimal period since gate 43—44 is opened by the control impulse M′ coming through 39. The pulses appearing at the output of regenerator 15 are applied to rectifier 47. Among these pulses, only the pulses 8 and 1 are available at the output of 47, 48. These pulses respectively take the values 2 and 4 when applied to EB′. As a mater of fact, said pulses reach EB′ in step with the pulses 2 and 4 of the transient sum having passed through delay element 23.

Among the circulating pulses appearing at point 77 and applied to 67, that pulse appearing on the third quarter of binary period 8 is permitted to pass by the gate 65, 66, 67. Due to delay element 76 of 0.5*p*, this pulse, which constitutes an artificial carry, is applied to terminal EC of AO through 71, on the first quarter of the binary period 1 in the second decimal period.

During said second decimal period, binary adder AO′ operates normally and only one pulse is available at the end of the binary period 1, at the output S, where it represents the value 4.

The artificial carry pulse follows a circuit path comprising AO, 14, 23, AO′ and appears at terminal S′ at the end of the binary period 4 in the second decimal period, thus assuming the value 1, and completing the result of the addition in the same manner as previously indicated.

In the preceding, only the addition of two numbers written in coded impulses has been treated. It will be readily seen that the diagram shown in Figure 1 may be applied to subtraction operations without modification, AO and AO′ then becoming subtraction operators for numbers written in pure binary, under the form of impulses, AO′ subtracting the value 6, each time the comparing device D, which remains unchanged detects, by means of the impulses leaving R and S, that it is necessary that this value be introduced into AO′. AO and AO′ are binary operators as described in the aforesaid application No. 280,820, capable of executing addition or subtraction, as the case may be, by application of a control voltage, corresponding to the desired operation, to an appropriate input: this capacity of the invention, has been shown in Figure 5, on which $P_1$ and $P_2$ correspond to the input terminal ES on Figure 3 of the application just referred to.

It is to be noted, that in practice, it would be of interest to have the control impulses last less than half of their recurrence period.

What is claimed is:

1. Electronic adding apparatus for adding together two numbers each represented by a serial train of pulses in coded group form, the successive pulse positions in each group representing the values of successive terms of the binary series, comprising: a first three-input binary adder with a first sum output terminal for delivering a first sum pulse train representing the binary coded sum of the numbers added, and a carry output terminal; a second three-input binary adder; a connection including a delay element for transmitting said first sum pulse train from the first sum output terminal of said first adder to a first input terminal of said second adder with a delay at least equal to a time interval corresponding to two pulse positions; a coincident pulse comparator including a pulse storage loop with a first input terminal, an output terminal, elements whose circulation time equals one binary pulse time period and a reset input terminal with means to normally clear said loop once at each pulse period, a first coincidence circuit connecting the sum output terminal of said first adder to the first input terminal of said loop and receiving control pulses timed to permit the entry in circulation into said loop of any pulse of value 2 or 4 existing in each first sum pulse group, a second coincidence circuit connecting the carry output terminal of said first adder to the first input terminal of said loop and receiving control pulses timed to permit the entry in circulation into said loop of any carry pulse from an 8 pulse position, a third coincidence circuit connecting the sum output terminal of said first adder to the reset input terminal of said loop and receiving timed control pulses, this arrangement being such that any pulse of value 2 or 4 in a first sum pulse group when entered in said loop is maintained circulating therein until the following pulse time position of value 1 inclusive if a pulse of value 8 has been present in the same sum pulse group; a connection linking the output terminal of said loop to a second input terminal of said second adder, said connection including a fourth coincidence circuit receiving control pulses timed to permit the last two pulses thus maintained circulating in said loop to be transmitted to the second input terminal of said second adder in step with pulses of value 2 and 4 eventually received on the first input terminal of said second adder.

2. Adding apparatus according to claim 1, wherein a delaying connection links the first input terminal of said loop to the carry input terminal of said first adder, said connection including a coincidence circuit receiving control pulses timed to permit the application of a tens carry pulse to said carry input terminal when pulses of values 2, or 4, and 8 have been entered into said loop.

3. Electronic adding apparatus for adding together two decimal numbers each represented by a serial train of pulses in coded group form, the successive pulse positions in each group representing the terms of the binary series, comprising: a first three-input binary adder with a sum output terminal for delivering a first sum pulse train, and a carry output terminal; a second three-input binary adder for delivering a final sum pulse train; a connection including a time delay element for transmitting said first sum pulse train to a first input terminal of said second adder with a delay at least equal to a time interval corresponding to two pulse positions; a pulse comparing arrangement including a single pulse-position storage loop with input and output terminals, two coincidence circuits each connecting one of the output terminals of said first adder to said loop and receiving differently timed control pulses, thereby permitting a pulse to enter circulation into said loop when a pulse is present in the 2 or 4 pulse position of any first sum pulse group or when a carry-out pulse appears in an 8 pulse position at said carry output terminal, a third coincidence circuit connecting said sum output terminal of said first adder to an input terminal of said loop and receiving timed control pulses, said third coincidence circuit being so connected and so operated by said control pulses that a pulse is maintained in circulation in said loop on the condition that a pulse appears in the 8 pulse position of the same sum pulse group, this maintaining being effective until and during the 1 pulse time position relative to the following pulse group; and a connection connecting the output terminal of said loop to a second input terminal of said second adder, said connection including a fourth coincidence circuit which receives control pulses timed to be in step with pulse positions of values 2 and 4 of the delayed first sum pulse train when reaching said second adder, said control pulses being applied for 6-correction to the said second input terminal of said second adder when a pulse is still circulating in said storage loop.

4. Electronic adding apparatus according to claim 3, including a delaying connection between the storage loop of said comparing arrangement and the carry-in input terminal of said first adder, said connection comprising a further coincidence circuit which receives control pulses timed to permit the application of a tens carry pulse to said last input terminal whenever a pulse circulates in said loop after occurrence of a pulse of value 2, or 4, followed by a pulse of value 8 in the same first sum pulse group.

5. Electronic adding apparatus according to claim 4, wherein a coincidence circuit is connected for operatively controlling entries at the third or carry-in input terminal of said second adder, said coincidence circuit receiving control pulses timed so that this circuit prevents the entry of any carry-in pulse having the value 1 in said second adder.

6. Electronic adding apparatus for adding together two serial trains of coded pulse groups representing two binary-coded decimal numbers, comprising a first three-input binary adder with a sum output terminal for delivering transient sum pulse groups and a carry output terminal; a second three-input binary adder for delivering a final sum pulse train; a delay element connected for transmitting said transient sum pulse groups to a first input of said second adder with a delay of at least two pulse positions; a pulse comparing device including a single pulse-position storage loop with multi-input and output terminals, first and second coincidence circuits each connecting one of the output terminals of said first adder to an input of said loop and receiving differently timed control pulses which make these circuits operative, so that a pulse will enter circulation into said loop each time one pulse has the value 2 or 4 in one of said transient sum pulse groups or when an 8 carry pulse leaves said carry output terminal, a third coincidence circuit having branches for connecting the sum output terminal of said first adder to a reset input of said loop and for receiving timed control pulses, said third coincidence circuit being so connected and so operated by said control pulses that a pulse is maintained in circulation in said loop on the condition that a pulse appears in the 8 pulse position of the same sum pulse group, this maintaining being effective until and during the 1 pulse time position relative to the following pulse group; and a connection connecting the output terminal of said loop to a second input terminal of said second adder, said connection including a fourth coincidence circuit receiving control pulses timed to permit this coincidence circuit to select two pulses thus maintained circulating in said loop and to transmit the same pulses to the second input terminal of said second adder in step with pulses of values 2 and 4 eventually received on the first input terminal of said second adder.

7. Electronic adding apparatus according to claim 6, wherein a delaying connection is connected from said loop to the carry input of said first adder and includes a coincidence circuit which receives control pulses timed to cause a tens carry pulse to be applied to said first adder when the sum represented in a transient sum pulse group amounts from 10 to 15.

References Cited in the file of this patent

UNITED STATES PATENTS 2,668,661 Stibitz ---------------- Feb. 9, 1954

OTHER REFERENCES

Investigations for Design of Digital Calculating Machinery, Progress Report No. 7 Harvard Computation Laboratory. March 22, 1950. Pages III–25 to III–47.

"High-Speed Computing Devices," Engineering Research Association; McGraw-Hill, July 28, 1950, pages 289–293.